(12) United States Patent
Overstreet et al.

(10) Patent No.: US 7,328,104 B2
(45) Date of Patent: Feb. 5, 2008

(54) SYSTEMS AND METHODS FOR IMPROVED INERTIAL NAVIGATION

(75) Inventors: Lisa M. Overstreet, Clearwater, FL (US); Robert H. Fall, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/383,895

(22) Filed: May 17, 2006

(65) Prior Publication Data

US 2007/0271037 A1  Nov. 22, 2007

(51) Int. Cl.
G01C 21/00 (2006.01)

(52) U.S. Cl. .................. 701/220; 701/214; 73/1.78; 244/3.2; 342/357.14; 318/582

(58) Field of Classification Search ............... 701/207, 701/220, 213, 214; 73/178, 1.77, 1.78, 1.38; 342/357.14, 357.15; 318/582; 340/988
See application file for complete search history.

(56) References Cited

U.S. PATENT DOCUMENTS

| | | | |
|---|---|---|---|
| 4,754,280 A | | 6/1988 | Brown et al. |
| 4,930,085 A | * | 5/1990 | Kleinschmidt ............... 701/207 |
| 5,001,646 A | * | 3/1991 | Caldwell et al. ............... 701/7 |
| 5,332,180 A | * | 7/1994 | Peterson et al. ............... 246/3 |
| 5,527,003 A | * | 6/1996 | Diesel et al. ............... 244/195 |
| 5,587,904 A | * | 12/1996 | Ben-Yair et al. ............ 701/213 |
| 5,590,044 A | * | 12/1996 | Buckreub ................... 701/220 |
| 5,617,317 A | * | 4/1997 | Ignagni ....................... 701/215 |
| 5,787,384 A | * | 7/1998 | Johnson ...................... 701/216 |
| 5,902,351 A | * | 5/1999 | Streit et al. ................. 701/220 |
| 5,923,286 A | | 7/1999 | Divakaruni |
| 6,157,891 A | * | 12/2000 | Lin ............................. 701/301 |
| 6,163,021 A | * | 12/2000 | Mickelson .................. 244/3.2 |
| 6,205,401 B1 | * | 3/2001 | Pickhard et al. ............ 701/220 |
| 6,246,960 B1 | * | 6/2001 | Lin ............................. 701/214 |
| 6,271,789 B1 | * | 8/2001 | Beerhold ............... 342/357.14 |
| 6,311,108 B1 | * | 10/2001 | Ammar et al. ................ 701/16 |
| 6,317,688 B1 | * | 11/2001 | Bruckner et al. ........... 701/213 |

(Continued)

FOREIGN PATENT DOCUMENTS

EP  1120665  1/2001

(Continued)

OTHER PUBLICATIONS

Autonomous GPS/INS navigation experiment for space transfer vehicle□□Upadhyay, T.N.; Cotterill, S.; Deaton, A.W.;□□Aerospace and Electronic Systems, IEEE Transactions on□□vol. 29, Issue 3, Jul. 1993 pp. 772-785□□.*

(Continued)

*Primary Examiner*—Thomas Black
*Assistant Examiner*—Jorge O Peche
(74) *Attorney, Agent, or Firm*—Fogg & Powers LLC (57) ABSTRACT

A method for producing inertial measurement data is provided. The method comprises receiving raw inertial measurement data from one or more inertial sensors; receiving raw position data based on signals from a global navigation satellite system; processing the raw inertial measurement data and the raw position data with a filter to generate state variable estimates; and calculating enhanced inertial measurement data based on the raw inertial measurement data and the state variable estimates from the filter.

18 Claims, 3 Drawing Sheets

U.S. PATENT DOCUMENTS

| | | | | |
|---|---|---|---|---|
| 6,324,448 | B1* | 11/2001 | Johnson | 701/7 |
| 6,353,408 | B1* | 3/2002 | Whight | 342/357.02 |
| 6,449,559 | B2* | 9/2002 | Lin | 701/216 |
| 6,459,988 | B1* | 10/2002 | Fan et al. | 701/213 |
| 6,459,990 | B1* | 10/2002 | McCall et al. | 701/220 |
| 6,496,778 | B1* | 12/2002 | Lin | 701/215 |
| 6,516,272 | B2* | 2/2003 | Lin | 701/214 |
| 6,573,486 | B1* | 6/2003 | Ratkovic et al. | 244/3.2 |
| 6,622,091 | B2* | 9/2003 | Perlmutter et al. | 701/214 |
| 6,654,685 | B2* | 11/2003 | McIntyre | 701/213 |
| 6,697,736 | B2* | 2/2004 | Lin | 701/214 |
| 6,704,619 | B1* | 3/2004 | Coleman et al. | 700/245 |
| 6,735,523 | B1* | 5/2004 | Lin et al. | 701/216 |
| 6,826,478 | B2* | 11/2004 | Riewe et al. | 701/220 |
| 6,859,727 | B2* | 2/2005 | Bye et al. | 701/210 |
| 6,865,477 | B2* | 3/2005 | Nicosia et al. | 701/207 |
| 6,879,875 | B1* | 4/2005 | Hu et al. | 700/213 |
| 6,883,747 | B2* | 4/2005 | Ratkovic et al. | 244/3.15 |
| 7,043,364 | B2* | 5/2006 | Scherzinger | 701/213 |
| 2002/0120400 | A1* | 8/2002 | Lin | 701/214 |
| 2002/0158796 | A1* | 10/2002 | Humphrey et al. | 342/357.14 |
| 2003/0016147 | A1* | 1/2003 | Evans | 340/988 |
| 2003/0176970 | A1* | 9/2003 | Lin | 701/214 |
| 2003/0216864 | A1* | 11/2003 | Fukuda et al. | 701/216 |
| 2005/0234644 | A1* | 10/2005 | Lin | 701/214 |
| 2006/0074558 | A1* | 4/2006 | Williamson et al. | 701/213 |
| 2006/0224321 | A1* | 10/2006 | Lund et al. | 701/220 |
| 2007/0010936 | A1* | 1/2007 | Nordmark et al. | 701/200 |
| 2007/0016371 | A1* | 1/2007 | Waid et al. | 701/213 |
| 2007/0032951 | A1* | 2/2007 | Tanenhaus et al. | 701/220 |
| 2007/0050138 | A1* | 3/2007 | Morgan et al. | 701/220 |
| 2007/0073481 | A1* | 3/2007 | Morgan et al. | 701/220 |
| 2007/0073482 | A1* | 3/2007 | Churchill et al. | 701/220 |
| 2007/0100550 | A1* | 5/2007 | Hawkinson | 701/220 |
| 2007/0118286 | A1* | 5/2007 | Wang et al. | 701/213 |

FOREIGN PATENT DOCUMENTS

WO          0022452          4/2000

OTHER PUBLICATIONS

Two antennas GPS-aided INS for attitude determination Yunchun Yang; Farrell, J.A.; Control Systems Technology, IEEE Transactions on vol. 11, Issue 6, Nov. 2003 pp. 905-918.*

Robust positioning technique in low-cost DR/GPS for land navigation Seong Yun Cho; Wan Sik Choi; Instrumentation and Measurement, IEEE Transactions on vol. 55, Issue 4, Aug. 2006 pp. 1132-1142.*

Rapid development of tightly-coupled GPS/INS systems Knight, D.T.; Aerospace and Electronc Systems Magazine, IEEE vol. 12, Issue 2, Feb. 1997 pp. 14-18.*

GPS/INS uses low-cost MEMS IMU Brown, A.K.; Aerospace and Electronic Systems Magazine, IEEE vol. 20, Issue 9, Sep. 2005 pp. 3-10.*

* cited by examiner

SYSTEMS AND METHODS FOR IMPROVED INERTIAL NAVIGATION

GOVERNMENT LICENSE RIGHTS

The U.S. Government may have certain rights in the present invention as provided for by the terms of Contract No. W9113M-05-C-0026 with the US Army/Missile Defense Agency.

BACKGROUND

Many large scale military and commercial navigation systems use software to arrive at navigation solutions. Inertial data from inertial measurement units (IMUs) are provided to the software, and based on the inertial data, the software determines position, velocity, attitude, and other parameters used to navigate vehicles such as missiles, aircraft, and spacecraft. The software associated with the navigation systems has often undergone very extensive and expensive verification and qualification—particularly for weapons or aircraft systems—to ensure that the navigation system achieves reliable navigation solutions as designed. The IMU is typically external to the navigation processing system executing the software and communicates the inertial measurement data to the software via an IMU interface. Performing inertial measurement functions with a device external to the navigation processing system affords system designers some flexibility in their choice of, and replacement of, IMUs for use in the systems because the IMU can be replaced without the need to revalidate the navigation processing system's software.

In order to update such navigation processing systems (hereinafter referred to as "legacy" systems) to create potentially more accurate systems, system designers find themselves having to add additional hardware and create new interfaces for their legacy systems, and significantly alter their existing software—all at great delay and expense. This is because the legacy systems and software are designed based on legacy IMU interfaces, which receive inertial measurement data in the form of changes in velocity (typically denoted by $\Delta v$) and changes in angle (typically denoted by $\Delta \theta$). For example, adding a global navigation satellite system (GNSS) receiver to a legacy system is one way to obtain improved positioning solution performance. The problem is that GNSS receivers output data in the form of position and velocity rather than in the form of changes in velocity ($\Delta v$) and changes in angle ($\Delta \theta$). Modification of the legacy system's software to accommodate the GNSS receivers output data would require re-verification and re-qualification of the navigation processing systems. The added expenses for this redesign and retesting tends to offset the possibility of achieving improved performance at the relatively small cost of an added GNSS receiver.

For the reasons stated above and for other reasons stated below which will become apparent to those skilled in the art upon reading and understanding the specification, there is a need in the art for systems and methods for improved inertial navigation.

SUMMARY

The Embodiments of the present invention provide methods and systems for systems and methods for improved inertial navigation and will be understood by reading and studying the following specification.

In one embodiment, a method for producing inertial measurement data is provided. The method comprises receiving raw inertial measurement data from one or more inertial sensors; receiving raw position data based on signals from a global navigation satellite system; processing the raw inertial measurement data and the raw position data with a filter to generate state variable estimates; and calculating enhanced inertial measurement data based on the raw inertial measurement data and the state variable estimates from the filter.

In another embodiment, a global navigation satellite system enhanced inertial measurement unit is provided. The unit comprises one or more inertial sensors adapted to detect a change in angular position ($\Delta \theta$) and a change in velocity ($\Delta v$) and generate raw inertial measurement data based on the detected change in angular position and change in velocity; a global navigation satellite system receiver adapted to generate raw position data based on signals received from a global navigation satellite system; a filter coupled to the one or more inertial sensors and the global navigation satellite system receiver, the filter adapted to calculate one or more estimated state variables including a change to the change in velocity ($\delta \Delta v$) and a change in the change in angular position ($\delta \Delta \theta$) based on the raw inertial measurement data and the raw position data; and an output generator adapted to calculate an enhanced inertial measurement data based on the sum of the raw inertial measurement data and the one or more estimated state variables.

In still another embodiment, a navigation system is provided. The system comprises means for generating raw inertial measurement data; means for generating raw position data; means for generating state variable estimates responsive to the means for generating raw inertial measurement data and the means for generating raw position data; and means for calculating enhanced inertial measurement data responsive to the means for generating raw inertial measurement data and the means for generating state variable estimates.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for an enhanced inertial measurement unit (IMU) that provides much more accurate data than current IMUs and will interface with external systems the same way as current IMUs. Standard IMU interfaces provide output data formatted in terms of a change in the IMU's angular position ($\Delta\theta$) and change in the IMU's velocity ($\Delta v$). Embodiments of the present invention utilize positioning data from a global navigation satellite system (GNSS) receiver and inertial measurement data from inertial sensors to develop enhanced precision $\Delta v$ and $\Delta\theta$ data for legacy navigation systems designed to receive $\Delta v$ and $\Delta\theta$ data. These legacy systems thus benefit from enhanced precision inertial measurement data without the need to modify any system software or input interfaces of the legacy system. Embodiments of the present invention enable a GNSS enhanced IMU that provides high precision inertial measurements through existing IMU interfaces.

Figure 1:
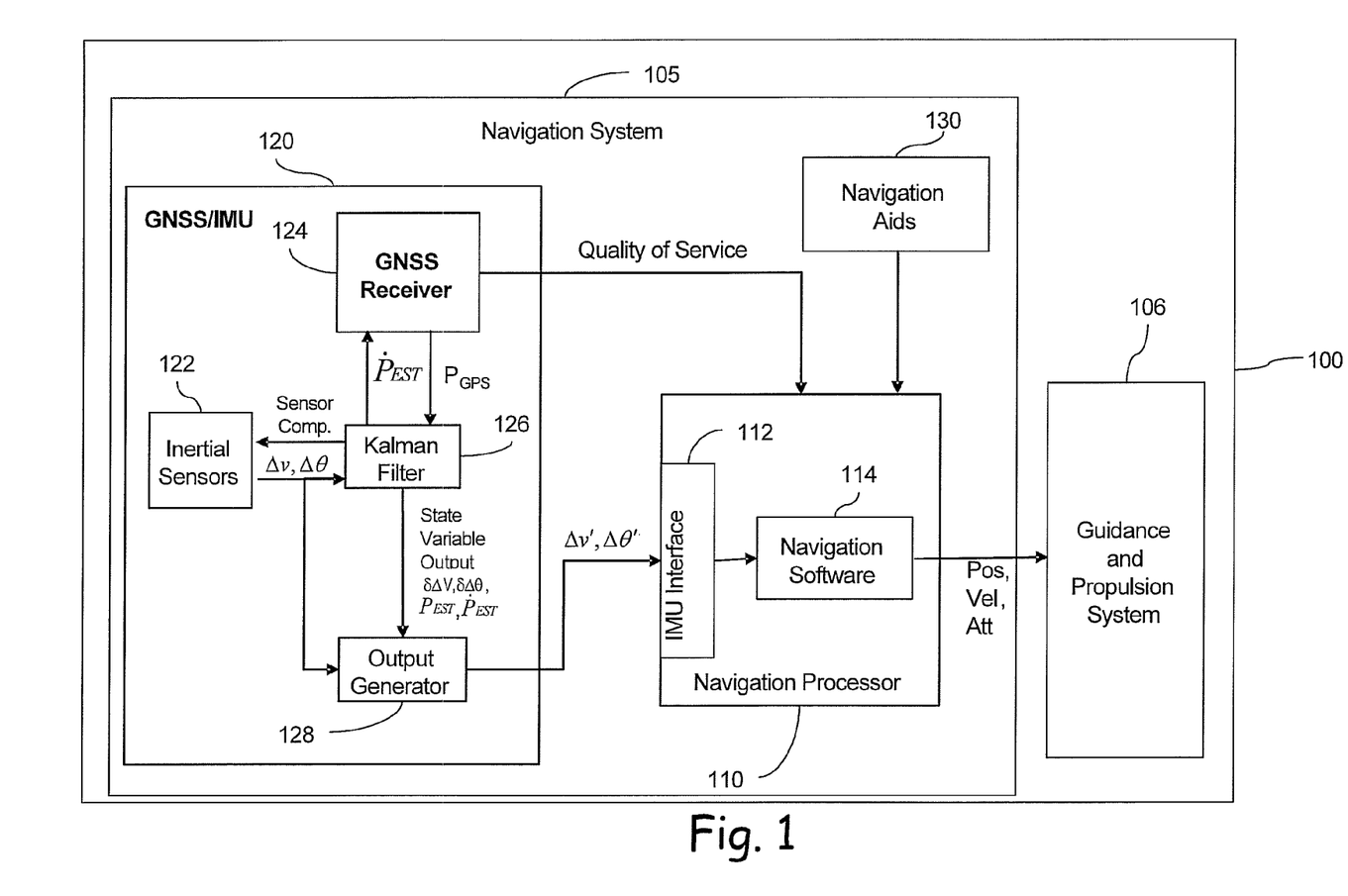
FIG. 1 is a block diagram of a navigation system of one embodiment of the present invention.

FIG. 1 is a block diagram illustrating a navigation system 105 for a vehicle 100 of one embodiment of the present invention. In alternate implementations, vehicle 100 comprises a vehicle such as, but not limited to, a missile, satellite, aircraft, or other vehicle that benefits from high precision positioning data for navigation purposes. Such positioning data may include one or more of vehicle 100's position, velocity and attitude. In one embodiment, vehicle 100's position is expressed in terms of latitude, longitude and altitude. In other embodiments, other reference coordinate frameworks are used to express vehicle 100's position. In one embodiment, vehicle 100's attitude is expressed in terms of yaw, pitch and roll. In other embodiments, other reference coordinate frameworks are used to express vehicle 100's attitude. In the embodiment of FIG. 1, navigation system 105 provides the positioning data to a guidance and propulsion system 106 which includes any of those functionalities necessary (for example, flaps, engines, thrusters, rockets) to maneuver vehicle 100 along a desired trajectory.

Navigation system 105 includes a navigation processor 110 coupled to a GNSS enhanced IMU 120 (referred to as GNSS/IMU 120) via an IMU interface 112. In operation, navigation processor 110 receives inertial measurement data from GNSS/IMU 120 via IMU interface 112 and based on that inertial measurement data, navigation software 114 calculates the position and velocity of vehicle 100 using one or more algorithms known to those in the art of navigation systems. In the embodiment shown in FIG. 1, navigation processor 110 is a legacy navigation system designed to receive inertial measurement data via IMU interface 112 in a form comprising change in angular position data ($\Delta\theta$) and change in velocity data ($\Delta v$).

GNSS/IMU 120 comprises one or more inertial sensors 122 a GNSS receiver 124, a Kalman filter 126, and an output generator 128. In one embodiment, inertial sensors 122 comprise a commercially available IMU. In operation, inertial sensors 122 detect changes in the angular position and velocity of vehicle 100 and output raw inertial measurement data (shown as $\Delta v$ and $\Delta\theta$) based on the detected changes. In one embodiment, inertial sensors 122 include one or more gyroscopes and accelerometers to produce the raw inertial measurement data. In one embodiment, GNSS receiver 124 comprises a global positioning system (GPS) receiver, a Galileo system receiver, or similar device that calculates its own position based on signals received from a GNSS. In operation, GNSS receiver 124 calculates it position based on signals received from a GNSS and outputs raw position data (shown as $P_{GPS}$). In alternate embodiments, the raw position data provides vehicle 100's position expressed in terms of latitude, longitude and altitude. In other embodiments, GNSS receiver 124 uses other reference coordinate frameworks to express vehicle 100's position.

Kalman filter 126 is coupled to inertial sensors 122 and GNSS receiver 124, and inputs the raw inertial measurement data ($\Delta v$, $\Delta\theta$) from inertial sensors 122 and the raw position data ($P_{GPS}$) from GNSS receiver 124. As would be appreciated by one skilled in the art upon studying this specification, a Kalman filter is a recursive filter which estimates one or more state variables of a dynamic system from a series of incomplete, noisy, or relatively imprecise measurements. Although a Kalman filter is specifically discussed in this specification, one of ordinary skill in the art upon reading this specification would appreciate that embodiments of the present invention are not limited to using Kalman filters but may use other such filters to estimate the one or more state variables. Using $\Delta v$, $\Delta\theta$ and $P_{GPS}$ as measured input data, Kalman filter 126 estimates the change occurring in the inertial measurements $\Delta v$ and $\Delta\theta$, and from the estimates outputs state variables $\delta\Delta v$ and $\delta\Delta\theta$, respectively. In one embodiment, Kalman filter 126 further estimates the position of vehicle 100, and the rate of change in position of vehicle 100, and outputs state variables ($P_{EST}$) and ($\dot{P}_{EST}$), respectively.

Output generator 128 is coupled to inertial sensors 122 and Kalman filter 126. Using the raw inertial measurement $\Delta v$ from inertial sensors 122, and the estimated state variable $\delta\Delta v$ calculated by Kalman filter 126, output generator 128 generates an enhanced inertial velocity measurement (shown as $\Delta v'$) based on the sum of $\Delta v+\delta\Delta v$. Similarly, using the raw inertial measurement $\Delta\theta$ from inertial sensors 122, and the estimated state variable $\delta\Delta\theta$ calculated by Kalman filter 126, IMU output generator 128 generates an enhanced inertial angular measurement (shown as $\Delta\theta'$) based on the sum of $\Delta\theta+\delta\Delta\theta$. The enhanced inertial measurement data ($\Delta v'$ and $\Theta'$) provides inertial measurements in the form of incremental velocity change and incremental angle change information expected by navigation system 110, enabling navigation system 110 to produce highly accurate positioning information for navigating vehicle 100.

Figure 2:
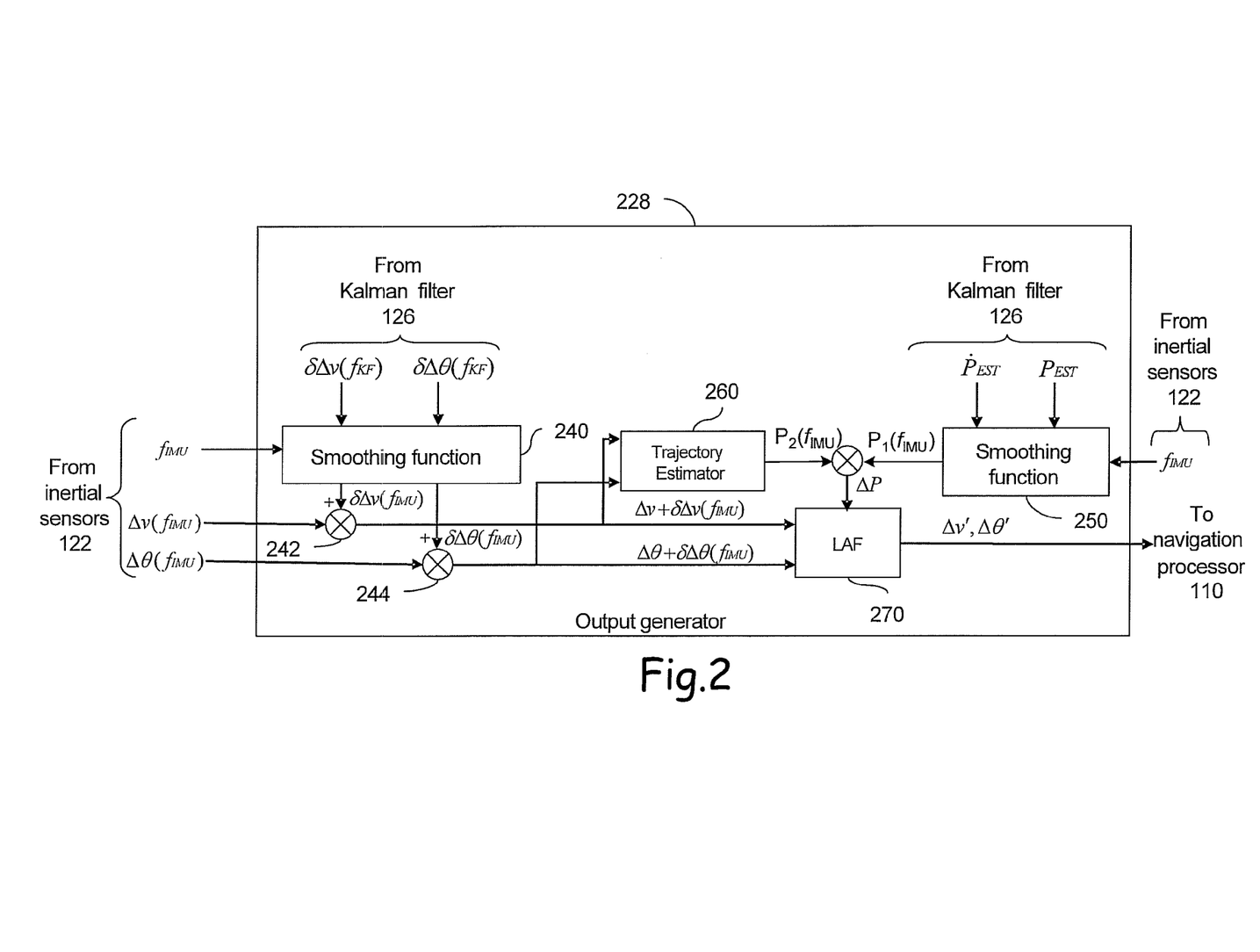
FIG. 2 is a block diagram of an output generator of one embodiment of the present invention.

FIG. 2 provides further details illustrating an output generator 228 of one embodiment of the present invention. Output generator functions as described with respect to the output generator of FIG. 1 by utilizing raw inertial measurements from inertial sensors 122 and estimated state variables from Kalman filter 126 to produce enhanced inertial measurements $\Delta v'$ and $\Theta'$.

As would be appreciated by one skilled in the art upon reading this specification, the output data rate of inertial sensors 122 may be different than the state variable update frequency provided by Kalman filter 126. Under such circumstances the $\Delta v'$ and $\Delta\theta'$ produced by simply summing the respective $\Delta v+\delta\Delta v$ and $\Delta\theta+\delta\Delta\theta$ values can produce data irregularities that will trigger transient detectors in inertial navigation software 114 used to implement navigation system 110. Output generator 228 avoids such irregularities in $\Delta v'$ and $\Delta\Theta'$ through a combination of data interpolation, extrapolation, and smoothing as discussed below.

In one embodiment, output generator 228 receives the raw inertial measurement data $\Delta v$ and $\Delta\theta$ from inertial sensors 122 at the inertial sensors 122's normal data output rate, illustrated in FIG. 2 by $\Delta v(f_{IMU})$ and $\Delta\theta(f_{IMU})$. Similarly, output generator 228 receives estimated state variables $\delta\Delta v$ and $\delta\Delta\theta$ from Kalman filter 126 at the state variable update rate, illustrated in FIG. 2 by $\delta\Delta v(f_{KF})$ and $\delta\Delta\theta(f_{KF})$. Output generator 228 further receives a clock frequency signal (illustrated in FIG. 2 by $f_{IMU}$) from inertial sensors 122 to facilitate the synchronization of the data received from inertial sensors 122 and Kalman filter 126. Output generator 228 includes a smoothing function 240 that receives the $\delta\Delta v(f_{KF})$ and $\delta\Delta\theta(f_{KF})$ updates from Kalman filter 126 before they are respectively summed with $\Delta v(f_{IMU})$ and $\Delta\theta(f_{IMU})$. Smoothing function 240 smoothes the $\delta\Delta v(f_{KF})$ and $\delta\Delta\theta(f_{KF})$ data by one or both of data interpolation and data extrapolation based on the clock frequency signal $f_{IMU}$ from inertial sensors 122 to produce respective values $\delta\Delta v$ and $\delta\Delta\theta$ having the same data output rate as inertial sensors 122 (illustrated in FIG. 2 by $\delta\Delta v(f_{IMU})$ and $\delta\Delta\theta(f_{IMU})$). $\Delta v(f_{IMU})$ and $\delta\Delta v(f_{IMU})$ are combined at summer 242 to produce $\Delta v(f_{IMU})+\delta\Delta v(f_{IMU})$, while $\Delta\theta(f_{IMU})$ and $\delta\Delta\theta(f_{IMU})$ are combined at summer 244 to produce $\Delta\theta(f_{IMU})+\delta\Delta\theta(f_{IMU})$.

In one embodiment, in order to further compensate for Kalman filter 126 latency when calculating $\Delta v'$ and $\Delta\theta'$ from $\Delta v(f_{IMU})+\delta\Delta v(f_{IMU})$ and $\Delta\theta(f_{IMU})+\delta\Delta\theta(f_{IMU})$, respectively, output generator 228 calculates the difference in vehicle 100's position when calculated from $\Delta v(f_{IMU})+\delta\Delta v(f_{IMU})$ and $\Delta\theta(f_{IMU})+\delta\Delta\theta(f_{IMU})$ versus vehicle 100's position as calculated by Kalman filter 126. In such an embodiment, output generator 228 also receives the estimate state variables ($P_{EST}$) and ($\dot{P}_{EST}$) from Kalman filter 126. For the reasons discussed above, the data rate of the $\Delta v(f_{IMU})+\delta\Delta v(f_{IMU})$ and $\Delta\theta(f_{IMU})+\delta\Delta\theta(f_{IMU})$ data can be different from the update frequency at which Kalman filter 126 updates the values of $P_{EST}$ and $\dot{P}_{EST}$. Therefore, output generator 228 includes a smoothing function 250 which receives the $P_{EST}$ and $\dot{P}_{EST}$ state variable output from Kalman filter 126 and, based on the clock frequency signal $f_{IMU}$ from inertial sensors 122, smoothes the $P_{EST}$ and $\dot{P}_{EST}$ state variable data by one or both of data interpolation and data extrapolation to produce a first estimate of vehicle 100's position that is updated at the same rate as the data output rate of inertial sensors 122 (illustrated in FIG. 2 by $P_1(f_{IMU})$). A second estimate of vehicle 100's position is provided by trajectory estimator 260, which receives the $\Delta v(f_{IMU})+\delta\Delta v(f_{IMU})$ output from summer 242 and the $\Delta\theta(f_{IMU})+\delta\Delta\theta(f_{IMU})$ output from summer 244, and from these values calculates the second estimated position of vehicle 100 (illustrated in FIG. 2 by $P2(f_{IMU})$). The difference between the first estimated position and the second estimated position (illustrated in FIG. 2 by $\Delta P$) is at least partially a function of the latency of Kalman filter 126. Based on $\Delta P$, lag adjustment function (LAF) 270 compensates for the latency by adjusting one or both of $\Delta v(f_{IMU})+\delta\Delta v(f_{IMU})$ and $\Delta\theta(f_{IMU})+\theta\Delta\theta(f_{IMU})$ to produce the enhanced output $\Delta v'$ and $\Delta\theta'$, respectively.

Referring back to FIG. 1, in one alternate embodiment, Kalman filter 126 also provides its estimate for the rate of change in position, $\dot{P}_{EST}$, to GNSS receiver 124. As would be appreciated by one skilled in the art upon reading this specification, GNSS receivers are often designed to provide improved position data when provided information about the receivers velocity. In one embodiment, GNSS receiver 124 is such a receiver and incorporates $\dot{P}_{EST}$ into its algorithm for arriving at its position solution. Also, GNSS receivers are also typically designed to provide a "quality of service" output that represents the quality of the position solution it is providing. For example, the quality of service output may indicate that the position solution is of higher quality when the GNSS receiver obtains its solution based on signals from a greater number of GNSS satellites, and a position solution of lower quality when GNSS receiver obtains its solution based on signals from a few number of GNSS satellites. In one embodiment, GNSS receiver 124 provides a quality of service output to navigation processor 110. In such an embodiment, navigation processor 110 weighs its reliance on the enhanced inertial measurement data $\Delta v'$ and $\Delta\theta'$ provided by GNSS/IMU 120 based on the quality of service information from GNSS receiver 124. In one embodiment, when the quality of service information from GNSS receiver 124 decreases, navigation processor 110 increases its reliance on one or more other navigation aids 130 (for example, inertial data from another IMU or position information from a star tracker) in performing its navigation calculations. In another embodiment Kalman filter 126 also produces an inertial sensor compensation signal that is received by inertial sensors 122 and used by the inertial sensors 122 to calibrate the accuracy of its raw inertial measurement output $\Delta v$ and $\Delta\theta$.

Figure 3:
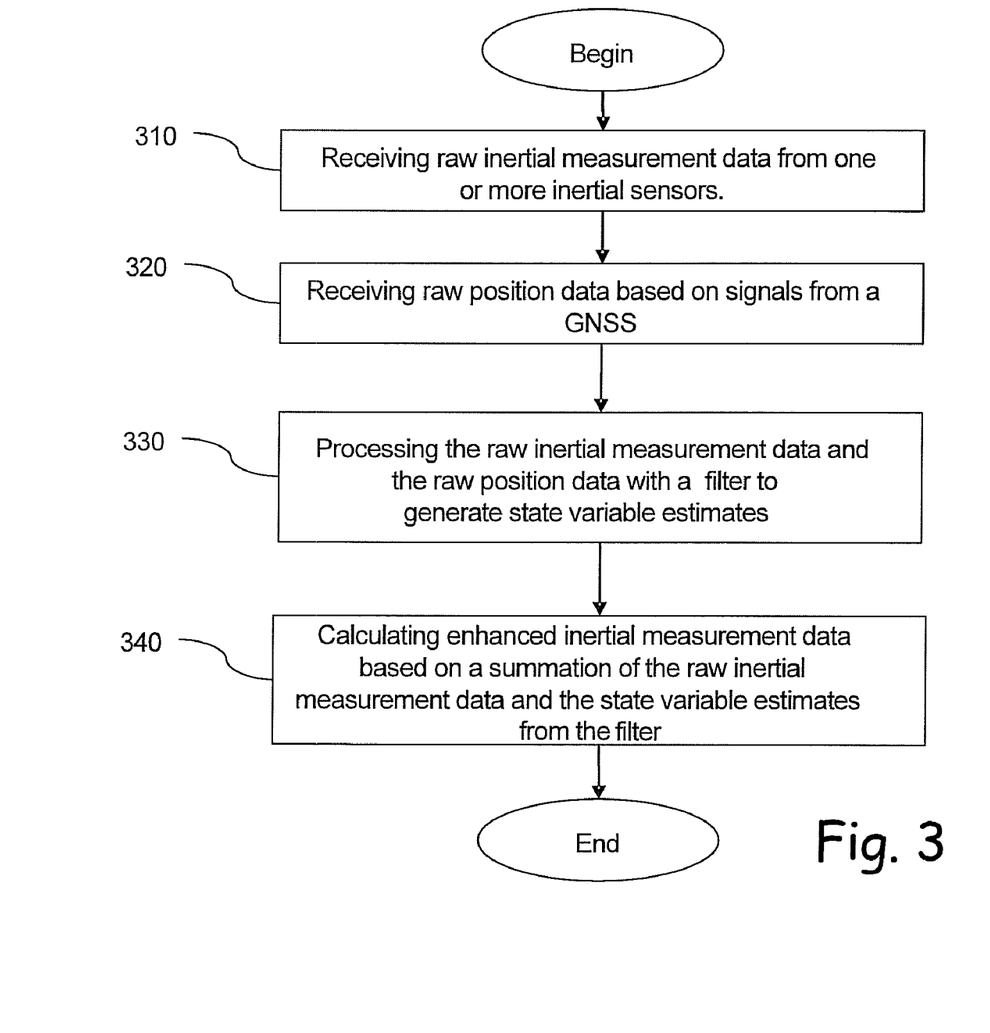
FIG. 3 is a flow chart of a method of one embodiment of the present invention.

FIG. 3 is a flow chart illustrating a method for producing inertial measurement data of one embodiment of the present invention. The method begins at 310 with receiving raw inertial measurement data from one or more inertial sensors. In one embodiment, the one or more inertial sensors include one or more gyroscopes and accelerometers. In one embodiment, the raw inertial measurement data includes changes in angular position ($\Delta\theta$) and changes in velocity ($\Delta v$) detected by the inertial sensors. The method proceeds to 320 with receiving raw position data based on signals from a GNSS. In one embodiment, the signals from the GNSS include one or both of signals from GPS satellites and signals from Galileo satellites. In one embodiment the raw position data includes latitude, longitude and altitude information. In other embodiments, the raw position data includes positioning information expressed in other reference coordinate frameworks. The method proceeds to 330 with processing the raw inertial measurement data and the raw position data with a Kalman filter to generate state variable estimates. In one embodiment, the state variable estimates include changes to inertial state variable $\Delta v$ (i.e., $\delta\Delta v$) and inertial state variable $\Delta\theta$ (i.e., $\delta\Delta\theta$). In one embodiment, the state variable estimates further include a vehicle position ($P_{EST}$) and a rate of change in the vehicle position ($\dot{P}_{EST}$). The method proceeds to 340 with calculating enhanced inertial measurement data based on a summation of the raw inertial measurement data and the state variable estimates from the Kalman filter. In one embodiment, calculating enhanced inertial measurement data includes calculating an enhanced inertial velocity measurement ($\Delta v'$) based on the sum of $\Delta v$ and $\delta\Delta v$. In one embodiment, calculating enhanced inertial measurement data includes calculating an enhanced inertial angular measurement ($\Delta\theta'$) based on the sum of $\Delta\theta$ and $\delta\Delta\theta$. The enhanced inertial measurement data ($\Delta v'$ and $\Delta\theta'$) provides inertial measurement data in the form of incremental velocity and angle information, which in one embodiment may be utilized by legacy navigation systems or other systems expecting inertial measurement data inputs, without the need to modify any system software or input interfaces of the legacy system.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for producing inertial measurement data, the method comprising:
   receiving raw inertial measurement data from one or more inertial sensors;
   receiving raw position data based on signals from a global navigation satellite system;
   processing the raw inertial measurement data and the raw position data with a filter to generate state variable estimates; and
   calculating enhanced inertial measurement data based on the raw inertial measurement data and the state variable estimates from the filter; and
   wherein processing the raw inertial measurement data and the raw position data with a filter to generate state variable estimates comprises generating state variable estimates including $\delta \Delta v$ and $\delta \Delta \theta$.

2. The method of claim 1, wherein receiving raw inertial measurement data from one or more inertial sensors comprises receiving instrument data from one or more of a gyroscope and an accelerometer.

3. The method of claim 1, wherein receiving raw inertial measurement data from one or more inertial sensors comprises receiving changes in angular position ($\Delta\theta$) data and change in velocity ($\Delta v$) data.

4. The method of claim 1, wherein receiving raw position data based on signals from a global navigation satellite system comprises receiving signals from one or more of a global positioning system satellite and a Galileo positioning system satellite.

5. The method of claim 1, wherein processing the raw inertial measurement data and the raw position data with a filter to generate state variable estimates further comprises generating state variable estimates including a position ($P_{EST}$) and a rate of change in position ($\dot{P}_{EST}$).

6. The method of claim 1, wherein the enhanced inertial measurement data provides inertial measurement data in the form of incremental velocity change and incremental angle change information.

7. A global navigation satellite system enhanced inertial measurement unit, the unit comprising:
   one or more inertial sensors adapted to detect a change in angular position ($\Delta\theta$) and a change in velocity ($\Delta v$) and generate raw inertial measurement data based on the detected change in angular position and change in velocity;
   a global navigation satellite system receiver adapted to generate raw position data based on signals received from a global navigation satellite system;
   a filter coupled to the one or more inertial sensors and the global navigation satellite system receiver, the filter adapted to calculate one or more estimated state variables including a change to the change in velocity ($\delta \Delta v$) and a change in the change in angular position ($\delta \Delta \theta$) based on the raw inertial measurement data and the raw position data; and
   an output generator coupled to the one or more inertial sensors and the filter and adapted to calculate an enhanced inertial measurement data based on the sum of the raw inertial measurement data and the one or more estimated state variables.

8. The unit of claim 7, wherein the inertial sensors comprise one or more gyroscopes and accelerometers that produce the raw inertial measurement data.

9. The unit of claim 7, wherein the global navigation satellite system receiver comprises one or both of a global positioning system (GPS) receiver and a Galileo positioning system receiver.

10. The unit of claim 7, wherein the output generator is further adapted to calculate an enhanced inertial velocity measurement ($\Delta v'$) based on the sum of the change in velocity ($\Delta v$) and the change to the change in velocity ($\delta \Delta v$), and calculate and enhanced inertial angular measurement ($\Delta\theta'$) based on the sum of the change in angular position ($\Delta\theta$) and the change in the change in angular position ($\delta \Delta \theta$).

11. The unit of claim 7, wherein the filter further calculates an estimated position ($P_{EST}$), and an estimated rate of change in position ($\dot{P}_{EST}$).

12. The unit of claim 11, wherein the output generator receives the estimated position ($P_{EST}$) and an estimated rate of change in position ($\dot{P}_{EST}$), and calculates a lag associated with the filter, wherein the output generator is further adapted to adjust the enhanced inertial measurement data based on the calculated lag.

13. The unit of claim 7, wherein the output generator is adapted to smooth the one or more estimated state variables to compensate for differences in a data output rate of the one or more inertial sensors and an update frequency of the filter.

14. A navigation system, the system comprising:
   means for generating raw inertial measurement data;
   means for generating raw position data;
   means for generating state variable estimates responsive to the means for generating raw inertial measurement data and the means for generating raw position data; and
   means for calculating enhanced inertial measurement data responsive to the means for generating raw inertial measurement data and the means for generating state variable estimates; and
   wherein the means for generating state variable estimates generates state variable estimates including one or more of a change to the change in velocity ($\delta \Delta v$), a change in the change in angular position ($\delta \Delta \theta$), position ($P_{EST}$) and a rate of change in position ($\dot{P}_{EST}$).

15. The system of claim 14, wherein the means for generating raw inertial measurement data outputs data in the form of changes in angular position ($\Delta\theta$) data and change in velocity ($\Delta v$) data.

16. The system of claim 14, wherein the means for calculating enhanced inertial measurement data is adapted to receives the estimated position ($P_{EST}$) and an estimated rate of change in position ($\dot{P}_{EST}$), and calculate a lag associated with the means for generating state variable estimates, wherein the means for calculating enhanced inertial measurement data is further adapted to adjust the enhanced inertial measurement data based on the calculated lag.

17. A navigation system, the system comprising:
   means for generating raw inertial measurement data;
   means for generating raw position data;
   means for generating state variable estimates responsive to the means for generating raw inertial measurement data and the means for generating raw position data; and
   means for calculating enhanced inertial measurement data responsive to the means for generating raw inertial measurement data and the means for generating state variable estimates; and
   wherein the means for calculating enhanced inertial measurement data generates data in the form of a change in angular position ($\Delta\theta'$) and a change in velocity ($\Delta v'$).

18. A navigation system, the system comprising:
means for generating raw inertial measurement data;
means for generating raw position data;
means for generating state variable estimates responsive to the means for generating raw inertial measurement data and the means for generating raw position data; and
means for calculating enhanced inertial measurement data responsive to the means for generating raw inertial measurement data and the means for generating state variable estimates; and wherein the means for calculating enhanced inertial measurement data is further adapted to calculate an enhanced inertial velocity measurement ($\Delta v'$) based on a sum of the a change in velocity ($\Delta v$) and a change to the change in velocity ($\delta \Delta v$), and calculate an enhanced inertial angular measurement ($\Delta \theta'$) based on a sum of a change in angular position ($\Delta \theta$) and a change in the change in angular position ($\delta \Delta \theta$).

* * * * *

UNITED STATES PATENT AND TRADEMARK OFFICE
CERTIFICATE OF CORRECTION

| | | |
|---|---|---|
| PATENT NO. | : 7,328,104 B2 | Page 1 of 1 |
| APPLICATION NO. | : 11/383895 | |
| DATED | : February 5, 2008 | |
| INVENTOR(S) | : Overstreet et al. | |

It is certified that error appears in the above-identified patent and that said Letters Patent is hereby corrected as shown below:

At Claim 17, Column 8, lines 54-67, replace "A navigation system, the system comprising: means for generating raw inertial measurement data; means for generating raw position data; means for generating state variable estimates responsive to the means for generating raw inertial measurement data and the means for generating raw position data; and means for calculating enhanced inertial measurement data responsive to the means for generating raw inertial measurement data and the means for generating state variable estimates; and" with --The system of claim 14,--

Signed and Sealed this
Twenty-third Day of August, 2011

David J. Kappos
*Director of the United States Patent and Trademark Office*